United States Patent

[11] 3,594,023

| [72] | Inventor | Shinkichi Yano<br>137-1, Sakurazuka Dori, 7-chome,<br>Toyonaka-shi, Osaka-Fu, Japan |
|------|----------|--|
| [21] | Appl. No. | 824,165 |
| [22] | Filed | May 13, 1969 |
| [45] | Patented | July 20, 1971 |

[54] JOINT FOR PREVENTING SLIP-OFF OF PIPES
3 Claims, 5 Drawing Figs.

[52] U.S. Cl. ..................................................... 285/337,
285/342, 285/369
[51] Int. Cl. ............................................... F16l 17/00
[50] Field of Search .......................................... 285/323,
342, 369, 337, 413

[56] References Cited
UNITED STATES PATENTS

| 817,300 | 4/1906 | David | 285/364 |
| 1,447,192 | 3/1923 | Watson | 285/337 |
| 2,779,610 | 1/1957 | Risley | 285/369 X |
| 2,832,615 | 4/1958 | Summers | 285/342 |

FOREIGN PATENTS

| 633,136 | 2/1962 | Italy | 285/369 |

Primary Examiner—Dave W. Arola
Attorney—Hall and Houghton

ABSTRACT: A joint of such a construction that fitted on an annular rubber packing fitted on a connection is a ring for urging said packing against a connection step portion, said ring being pulled toward the connection step portion by clamp bolts and nuts to compress the packing between said ring and connection step portion, thereby pressing said packing against the connection step portion and against a pipe surface to prevent leakage of water through the connection and prevent the slip-off of a pipe by the frictional force of the packing, said joint being additionally provided with a split ring for grasping the pipe and a holding ring for giving a wedging action to said split ring, said holding ring being pulled by the utilization of the clamp bolts and nuts toward the ring for urging the packing against the connection step portion, the wedging action exerted by the split and holding rings being effective to reduce the diameter of the split ring and cause the split ring to be grasped around the pipe surface. Other advantages and details of the arrangement will be made clear.

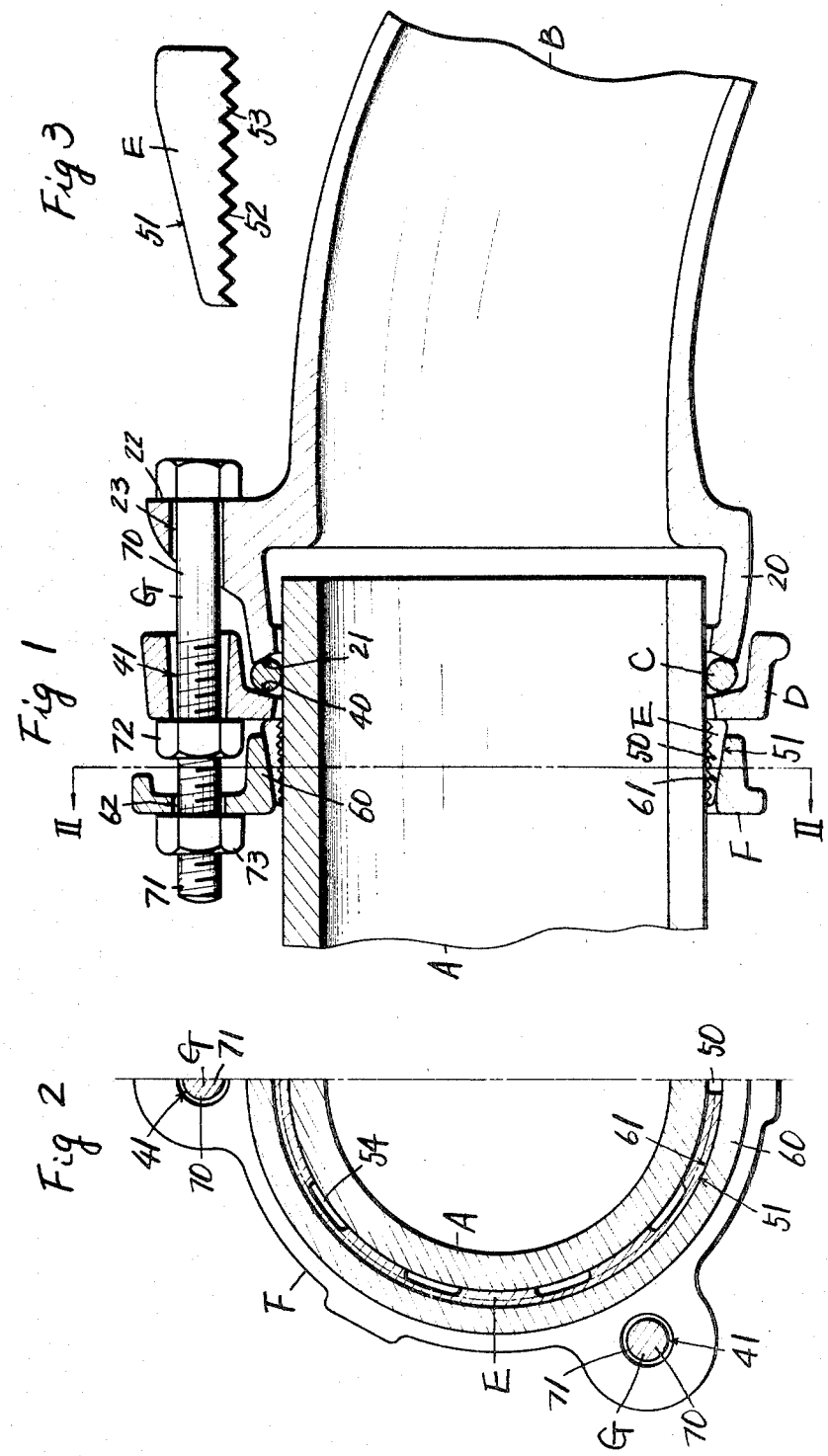

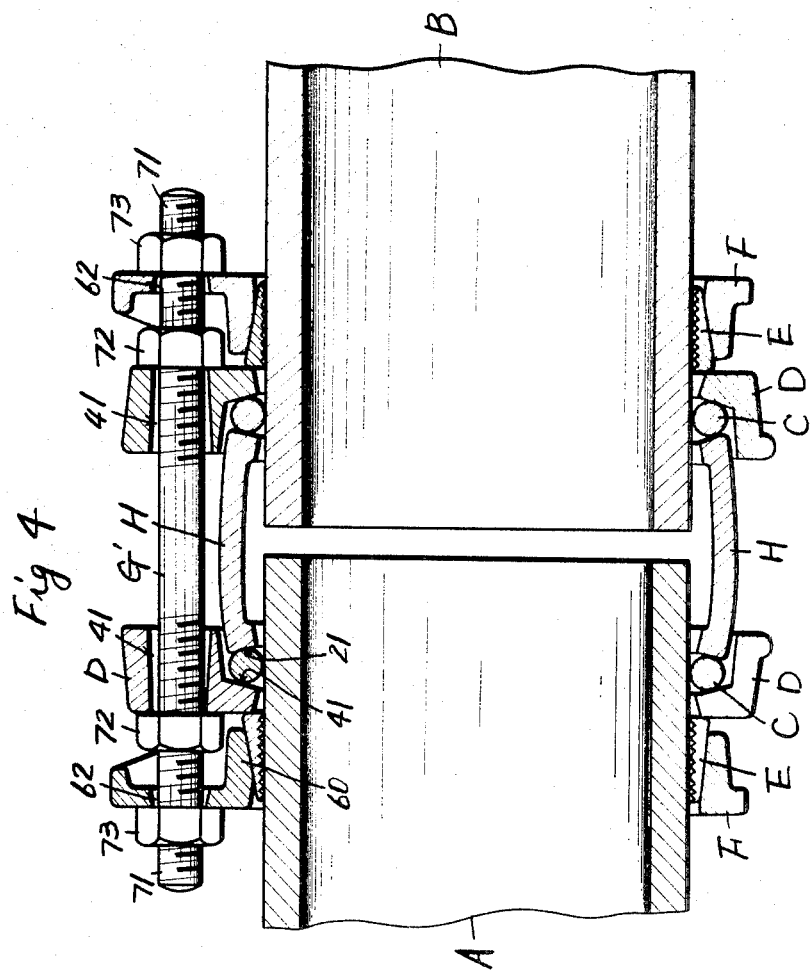
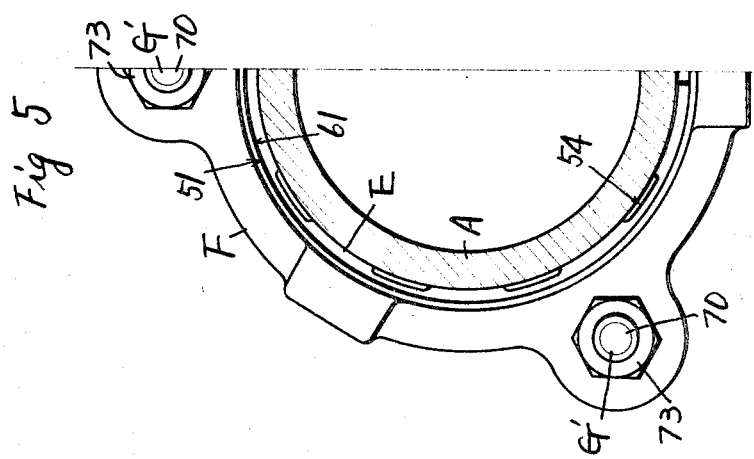

3,594,023

JOINT FOR PREVENTING SLIP-OFF OF PIPES

Background of the Invention

1. Field of the Invention

The present invention relates to a joint for preventing the slip-off of pipes used at the jointed region of water-service pipes, etc.

2. Description of the Prior Art

The known joint of this type is so arranged that a number of threaded rods are screwed into a pusher ring for an annular rubber packing and tightened up to hold down the surface of a pipe or part of a pusher ring is locally cut through to provide a clamp clearance and the portion cut through is clamped by threaded rods to grasp the surface of a pipe, thereby to prevent the slip-off of the pipe. With such arrangement, however, the prevention of the slip-off of a pipe depends solely on the clamping force of the threaded rods or only on the clamp retention force, so that there is a disadvantage in that if slip-off force due to pipe inner-pressure, etc. exceeds the clamp retention force or the clamping force of the threaded rods, the jointed part tends to slip off easily, thus failing to meet the requirements for the joint.

Summary of the Invention

The present invention provides an improved joint for preventing the slip-off of pipes for use at the jointed region of water-service pipes, etc., of such a construction that fitted on an annular rubber packing fitted on a connection is a ring for urging said packing against a connection step portion, said ring being pulled toward the connection step portion by clamp bolts and nuts to compress the packing between said ring and connection step portion, thereby pressing said packing against the connection step portion and against a pipe surface to prevent leakage of water through the connection and prevent the slip-off of a pipe by the frictional force of the packing, said joint being characterized in that a split ring of wedgelike cross section locally cut through and having an inclined surface on the upper outer surface thereof is fitted on said ring for compressing the packing; a holding ring having an inclined surface conforming to the inclined surface of said split ring is fitted on the split ring; the outward threaded extensions of clamp bolts are passed through said holding ring and a second group of clamp bolts cause the holding ring to slide toward the connection, whereby the wedging action of the two inclined surfaces causes the diameter of the split ring to be reduced and the entire inner surface of said split ring to be urged against the outer surface of the pipe, thereby wedgewise securing the pipe in position so as to prevent it from slipping off.

Brief Description of the Drawings

In the accompanying drawings showing preferred embodiments of the invention:

FIG. 1 is a longitudinal section showing the use of a joint according to the invention for connection between a straight pipe and a flanged bent pipe;

FIG. 2 is a longitudinal section on the line II–II of FIG. 1;

FIG. 3 is an enlarged section of a split ring;

FIG. 4 is a section showing the use of a joint according to the invention for connection between straight pipes having no flange; and FIG. 5 is a left-hand end view thereof.

Description of Preferred Embodiments

In a preferred embodiment shown in FIGS. 1 and 2, the inventive article comprises pipes A and B to be connected together, a packing C made of elastic material for preventing leakage of water through a connection, a packing compressing ring D made of metal or hard synthetic resin for pressing said packing against a connection step portion, a wedge-shaped split ring made of metal and cut through at one place or divided into two or more pieces for preventing a pipe from slipping off, a holding ring F for giving a wedging action to said split ring, and a clamping fixture G having a double nut for urging said rings D and F respectively against the rubber packing C and split ring E. In cases where neither of the pipes A and B has a flange, as shown in FIGS. 4 and 5, a short pipe H for covering the adjoining ends of the pipes A and B is used, fixtures and packings such as shown in FIGS. 1 and 2 are installed at the opposite ends of the short tube and two holding rings F and F' are tightened by clamp fixtures G'. The same reference characters as those in FIGS. 1 and 2 indicate the same parts.

The arrangement of the novel article according to the present invention will now be more fully described with reference to FIGS. 1 and 3.

The pipe A is a headless straight tube and fitted in the enlarged portion 20 of the other bent pipe B. The rubber packing C is fitted on the straight tube A. The ring D is fitted at the lateral edge of the rubber packing C, i.e., on the straight pipe A and that on the opposite side of the pipe B. That is to say, the rubber packing C is interposed between the ring D and the end surface of the pipe B. The end surface 40 of the ring D and the end surface 21 of the pipe B are inclined so that when the ring D and pipe B are urged toward each other and packing C may be pressed against the surface of the pipe A. The peripheral surface of the ring D is bored with several equispaced holes 41 through which bolts 70 extend. The drawing shows a case in which three holes (41) are provided. The split ring E is fitted on the ring D. The split ring E is cut through at one place as at 50. The split ring E may be divided into two or more pieces. The sectional shape of the split ring E is as shown in FIG. 3. Thus, the upper edge opposed to the holding ring F is formed as an inclined surface 51 and the inner surface 52 in contact with the pipe A is formed with several circumferentially extending ridges 53. If such ridges are circumferentially interrupted as at 54, as shown in FIG. 2, the grasping effect on the pipe A is further increased. The thickness of the split ring is such that the split ring abuts against the ring D. The holding ring F has a flange 60 extending toward the split ring E, and the inner surface 61 of said flange 60 is inclined so as to make surface contact with the inclined surface 51 of the split ring E. The peripheral surface of the holding ring F is provided with equispaced holes 62 through which bolts 70 extend.

The sequence of connection of the pipes A and B by means of this joint is as follows.

First, the ring F is fitted on the pipe A and then the rings E, D and packing C are fitted in order mentioned on the pipe A. Thereafter, the pipe A is fitted in the enlarged portion 20 of the pipe B and the holes 41 in the ring D are aligned with the holes 23 in the flange 22 of the pipe B, whereupon bolts 70 are inserted into the holes 23 and 41 with the threaded portions 71 thereof directed toward the pipe A. A first group of nuts 72 are then screwed onto the threaded portions 71 to press the ring D against the packing C to bring the latter into close contact with a connection step portion 80 and the surface of the pipe A.

Thereafter, the split ring E and the ring F are positioned at the rear of the ring D, as shown, and the threaded portions 71 of said bolts 70 are inserted into the holes 62 in the ring F and a second group of nuts 73 are screwed onto said threaded portions 71. Thus, the inclined inner surface 61 of the ring F is urged against the inclined upper surface 51 of the split ring E, said inclined surfaces 51 and 61 acting to reduce the diameter of the split ring E to cause the ridges 53 on the inner surface of the ring E to penetrate into the upper surface of the pipe A, thereby preventing the pipe A from slipping off.

While there have been described herein what are at present considered preferred embodiments of the several features of the invention, it will be obvious to those skilled in the art that modifications and changes may be made without departing from the essence of the invention. It is therefore to be understood that the exemplary embodiments thereof are illustrative and not restrictive of the invention, the scope of which is defined in the appended claims and that all modifications that come within the meaning and range of equivalency of the claims are intended to be included therein.

I claim:
1. A pipe joint construction comprising, in combination:
 a. a first pipe section having an end face,
 b. a second pipe section of an external size smaller than the internal size of said first pipe section and slidably entering thereinto past said end face,
 c. a gasket embracing said second pipe section and abutting against the end face of said first pipe section,
 d. a packing ring surrounding said second pipe section and having an end face separated from the end face of said first pipe section by said gasket,
 e. at least one of said end faces being inwardly inclined away from the other for urging said gasket toward said second pipe section when compressed between said end faces,
 f. adjustable means for drawing said packing ring toward said first pipe section to so compress said gasket,
 g. a wedge shaped split ring surrounding said second pipe section, said split ring having a pipe-gripping inner surface and an inclined outer surface and having its thicker end bearing against said packing ring,
 h. a wedging ring having an inclined inner surface complimentarily embracing said split ring and adapted to compress said split ring against said packing ring and said second pipe when drawn toward said packing ring, and
 i. means for drawing said wedging ring toward said packing ring to force said split ring against said packing ring and compress said split ring into gripping relation to said second pipe section.

2. A pipe joint construction as claimed in claim 1, wherein:
 j. said packing ring and said wedging ring have outwardly extending portions with aperture means therein aligned with each other;
 k. said adjustable means and said drawing means comprise threaded rod means extending through said aligned aperture means; securing means carried by at least one of said pipe sections and said rod means for securing said rod means relative to said first pipe section; and first and second nut means on said threaded rod means for bearing against said packing ring and said wedging ring, respectively.

3. A pipe joint construction as claimed in claim 2, wherein said first pipe section is relatively short and has a second end face, wherein a second set of said elements referred to in clauses (b), (c), (d), (e), (f), (g) and (h) duplicating and arranged in the same fashion as the first set thereof if provided at said second end face and wherein said first and second sets are interconnected by said rod means which is common to said sets, so that each of said sets constitutes the rod securing means referred to in clause (k) with respect to the other set.